United States Patent [19]
Kojima

[11] Patent Number: 5,091,848
[45] Date of Patent: Feb. 25, 1992

[54] VECTOR PROCESSOR FOR MERGING VECTOR ELEMENTS IN ASCENDING ORDER MERGING OPERATION OR DESCENDING ORDER MERGING OPERATION

[75] Inventor: Keiji Kojima, Kodaira, Japan

[73] Assignee: Hitachi, Ltd., Tokyo, Japan

[21] Appl. No.: 179,987

[22] Filed: Apr. 11, 1988

[30] Foreign Application Priority Data

Apr. 10, 1987 [JP] Japan .................................. 62-86846

[51] Int. Cl.[5] ........................... G06F 7/24; G06F 7/36; G06F 15/347
[52] U.S. Cl. ................... 395/800; 364/222.9; 364/262.1; 364/262.3; 364/232.21; 364/736; 364/DIG. 1
[58] Field of Search ............... 364/200, 900, 736, 730; 340/146.2

[56] References Cited

U.S. PATENT DOCUMENTS

| | | | |
|---|---|---|---|
| 3,418,632 | 12/1968 | Batcher | 340/146.2 |
| 3,428,946 | 2/1969 | Batcher | 340/172.5 |
| 3,587,057 | 6/1971 | Armstrong | 364/900 |
| 3,775,753 | 11/1973 | Kastner | 340/172.5 |
| 4,295,206 | 10/1981 | Cain et al. | 364/900 |
| 4,303,989 | 12/1981 | Membrino et al. | 364/900 |
| 4,410,960 | 10/1983 | Kasuya | 340/146.2 |
| 4,628,483 | 12/1986 | Nelson | 364/900 |
| 4,779,192 | 10/1988 | Torii et al. | 364/200 |
| 4,799,152 | 1/1989 | Chuang et al. | 364/200 |
| 4,809,158 | 2/1989 | McCauley | 364/200 |
| 4,939,639 | 7/1990 | Lee et al. | 364/200 |

FOREIGN PATENT DOCUMENTS 0149213 7/1985 European Pat. Off. .
0184828 6/1986 European Pat. Off. .

OTHER PUBLICATIONS

Patent Abstracts of Japan, vol. 9, No. 182, (P-376)(1905), Jul. 27th, 1985.
Communications for the ACM, vol. 21, No. 10, Oct. 1978, pp. 847-856; R Sedgewick, "Implementing Quicksort Programs".

*Primary Examiner*—Michael R. Fleming
*Assistant Examiner*—Gopal C. Ray
*Attorney, Agent, or Firm*—Antonelli, Terry, Stout & Kraus

[57] ABSTRACT

Vector elements are compared in synchronism with the supplying of vector elements to the an operation unit for merging, and the operation to be effected on the individual vector elements is selected depending upon the compared results. A break is detected between elements arranged in ascending order and elements arranged in descending order, and the merging of the vector elements subsequently read is effected for either ascending order elements or descending order elements depending upon the detected result.

38 Claims, 9 Drawing Sheets

| | INPUT | | | | | OUTPUT | | | | |
|---|---|---|---|---|---|---|---|---|---|---|
| | CMP1 | CMP2 | CMP3 | MODE | END | UP1 | UP2 | UP3 | UMPC | |
| 1 | ≤ | ≤ | ≤ | 0 | 0 | 1 | 0 | 1 | 0 | ⎫ |
| 2 | ≤ | > | ≤ | 0 | 0 | 0 | 1 | 1 | 0 | |
| 3 | ≤ | × | > | 0 | 0 | 1 | 0 | 1 | 0 | 108a |
| 4 | > | × | ≤ | 0 | 0 | 0 | 1 | 1 | 0 | |
| 5 | > | ≤ | > | 0 | 0 | 0 | 1 | 1 | 1 | |
| 6 | > | > | > | 0 | 0 | 1 | 0 | 1 | 1 | ⎭ |
| 7 | ≥ | ≤ | ≥ | 1 | 0 | 0 | 1 | 1 | 0 | ⎫ |
| 8 | > | > | ≥ | 1 | 0 | 1 | 0 | 1 | 0 | |
| 9 | ≥ | × | < | 1 | 0 | 1 | 0 | 1 | 0 | |
| 10 | < | × | ≥ | 1 | 0 | 0 | 1 | 1 | 0 | 108b |
| 11 | < | ≤ | < | 1 | 0 | 1 | 0 | 1 | 1 | |
| 12 | < | > | < | 1 | 0 | 0 | 1 | 1 | 1 | |
| 13 | × | × | × | × | 1 | 0 | 0 | 1 | 0 | ⎭ |

5,091,848

VECTOR PROCESSOR FOR MERGING VECTOR ELEMENTS IN ASCENDING ORDER MERGING OPERATION OR DESCENDING ORDER MERGING OPERATION

BACKGROUND OF THE INVENTION

The present invention relates to a vector processor, and more specifically to a vector processor suited for processing symbols, such as by sorting the symbols.

So far, an apparatus has been known which consists of specially designed hardware for sorting data sequences at high speeds, relying upon vector processing as disclosed in Japanese Patent Laid-Open No. 134973/1985 (or corresponding U.S. patent application Ser. No. 685616 or corresponding EP 84 116094.8). This apparatus makes it possible to sort mergings in the form of vectors that could not hitherto have been treated in the form of vectors.

According to the above prior art, however, no attention has been given to cases where data sequences that are to be sorted are biased, e.g., where input data sequences have almost all been sorted already. This problem will now be described briefly with reference to drawings.

FIG. 10 is a diagram which schematically illustrates a sorting method using a vector processor according to the conventional art. When the input vector elements to be sorted consist of 2, 5, 7, 4, 1, 6, 8 and 3 according to this method, the vector elements are divided at the center into two vectors, i.e., X=(2, 5, 7, 4) and Y=(1, 6, 8, 3). Next, based on a prerequisite that the data are arranged in a random fashion in the vectors X and Y, the length of ascending order elements in each of the vectors is designated to be 1 to serve as a parameter at the time of executing the merge sorting instruction, and the data are merged one by one from the start of the vectors X and Y. The merging stands for a processing in which the elements of X and Y are compared and the smaller one (or the larger one) is produced. As a result, vectors 1, 2, 5, 6, 7, 8, 3 and 4 are produced in which successive pairs of elements have been sorted. Therefore, the vectors are divided again into a vector X=(1, 2, 5, 6) and a vector Y=(7, 8, 3, 4). The merge sorting instruction now designates that there are ascending order elements having a length 2 in each of the vectors, and then the successive pairs of elements are merged. As a result, vectors 1, 2, 7, 8, 3, 4, 5 and 6 are produced in which successive four elements are sorted. The vectors are divided again into X=(1, 2, 7, 8) and Y=(3, 4, 5, 6). This time, the elements are merged with the length of ascending order elements as 4, and the sorting of the whole elements is completed.

According to this system, it is allowable to designate only elements having a predetermined length as ascending order elements in the vectors, but it is not allowable to process vectors that consist of elements having varying lengths. That is, the length of the ascending order elements is doubled for each merging, i.e., the length increases to 1, 2, 4, — for each merging. Therefore, if the length of the input vector is N, the merging must be carried out $\log_2 N$ times. In this case, the merging must be carried out $\log_2 8 = 3$ times. This system is based on the presumption that the input vectors are arranged in a random fashion. In practically inputting the data, however, the data are biased in many cases. For instance, the data may be arranged nearly in ascending order from the first. This system, however, is not capable of utilizing the nature of such data elements.

A known method adapted to the scalar processor consists of utilizing the properties that exist in the data elements to increase the efficiency (e.g., see Knuth, E. E.: "The Art of Computer Programming Vol. 3, Sorting and Searching", Addison-Wesley (1973)).

By merging ascending order data elements having varying lengths or descending order data elements having varying lengths in the input data elements, it is possible to perform the sorting with a reduced number of mergings compared with merging by the conventional scalar processor.

The above-mentioned literature, however, does not disclose how the above method can be adapted to a vector processor.

SUMMARY OF THE INVENTION

The object of the present invention is to provide a vector processor which is suited for processing vectors that consist of ascending order or descending order elements having varying lengths at high speeds.

For this purpose according to the present invention, vector elements are compared with vector elements that precede the vector elements in synchronism with the supply of the vector elements to the arithmetic unit, and the operation to be effected for tee individual vector elements is selected depending upon the comparison results.

Concretely speaking according to the present invention, a break is detected between the elements arranged in ascending order and the elements arranged in descending order that are read subsequently in parallel with the execution of the merging for the vector element read in the previous time, and the merging for the vector elements subsequently read is effected for either the ascending order elements or the descending order elements depending upon the detected result.

DESCRIPTION OF THE PREFERRED EMBODIMENT

Figure 11:
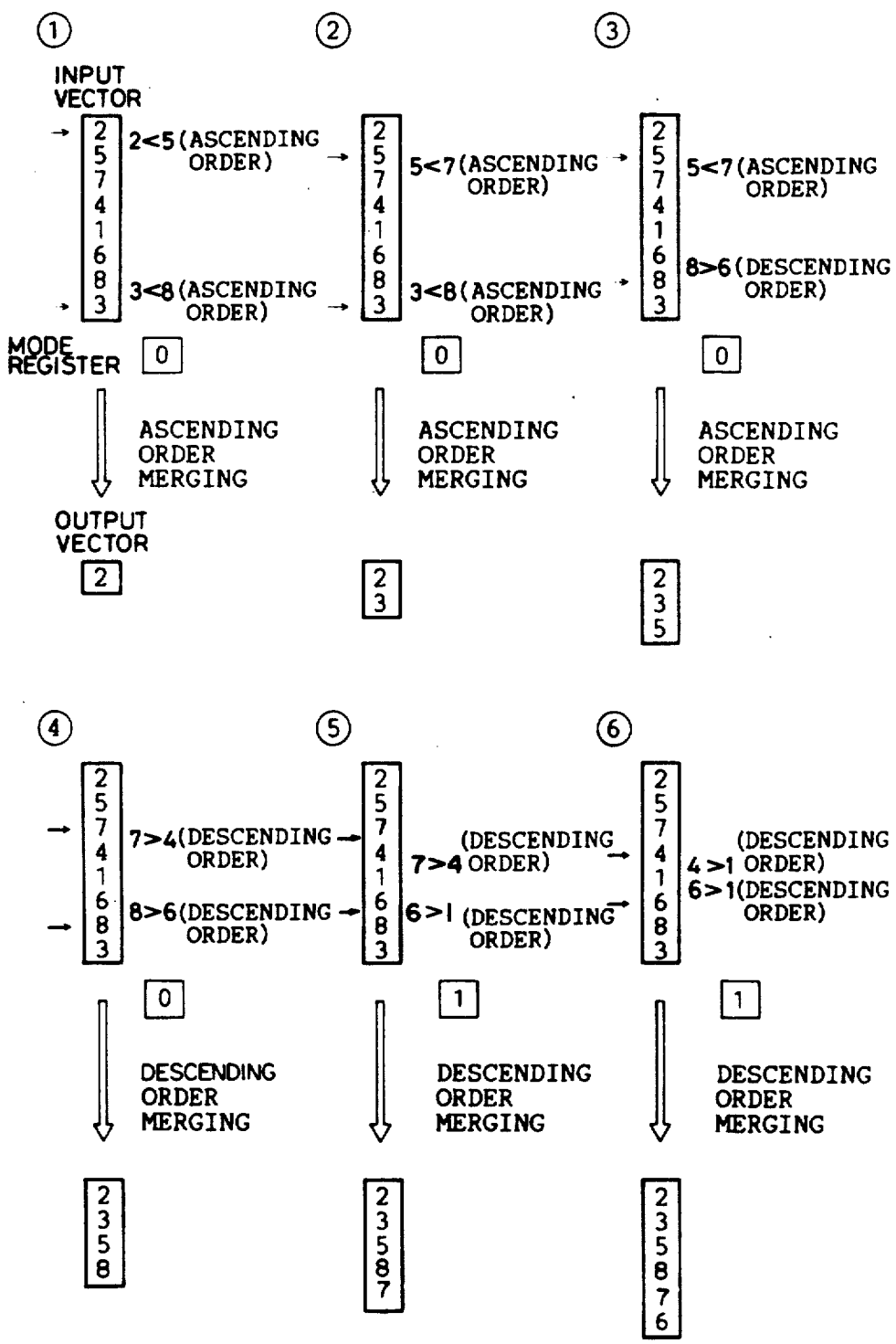
FIG. 11 is a diagram which schematically illustrates the merging according to the present invention.

Prior to describing the invention in detail, the merging according to the embodiment will be described briefly with reference to FIG. 11. An input vector consisting of vector elements 2, 5, 7, 4, 1, 6, 8 and 3 is processed starting from both ends thereof. First, the neighboring consecutive vector elements are compared with regard to their magnitudes in order to examine whether the data are arranged in ascending order or in descending order. For instance, 2<5 holds true from the upper end and 3<8 holds true from the lower end, indicating that the vector elements are arranged in ascending order. The operation mode includes an ascending merge mode and a descending merge mode, and values "0" and "1" are set to the operation mode register to correspond thereto. If now an initial value "0" is set to the operation mode register, the operation is started with the ascending merge mode. In the ascending merge mode, the elements are produced in the order of increasing magnitude. Therefore, the element "2" is produced, first. The next consecutive two elements from the upper end are compared to be 5<7; i.e., the ascending order is still maintained. Therefore, the operation mode does not change, and "3" is produced. The next consecutive two elements from the lower end are compared to be 8>6; i.e., the ascending order is changed to the descending order. Here, since there is no ascending order element from the lower end, the ascending order element "5" from the upper end is produced. As a result, the consecutive two elements from the upper end are compared to be 7>4; i.e., the ascending order is changed into the descending order. Between "7" and "8" therefore, the larger one is produced, i.e., "8" is produced. Here, since the first ascending order element no more exists, the operation mode register is renewed to "1", and the descending order vector elements are merged. In the descending order merging mode, the elements are produced in the decreasing order. Therefore, "8" is produced first. Like the case of the ascending order vector elements, the descending order vector elements are merged. Similarly, when there exists neither an ascending order vector element nor a descending order vector element, the mode is renewed and elements of the next subsequence are merged.

This makes it possible to detect the break among the subsequences of elements in parallel with the merging operation. It is further allowed to carry out the ascending mode merging and the descending mode merging without re-starting the instruction in response to the ascending order and descending order vector elements, making it possible to carry out pipeline processing maintaining good efficiency.

The present invention can be adapted not only to such merge processing but also to any other processing.

An embodiment of the present invention will now be described in detail in conjunction with the drawings. First, the structure and operation of the vector processor according to an embodiment of the present invention will be briefly described with reference to FIG. 1.

A vector merging instruction stored in a main storage 111 is read onto an instruction word register 101 through a data path 129. In response to this instruction, a timing control circuit 105 produces a variety of control signals. In parallel with this, data required for executing the instruction are sent from a group of general-purpose registers 103 to an operand control circuit 106, a mode control circuit 107, and address control circuits 109X to 109Z and are set up thereto to initialize these circuits.

After being initialized, the timing control signal 105 repetitively sends to the main storage 111 the fetch request FREQ for elements of a first vector (hereinafter referred to as vector X) and a second vector (hereinafter referred to as vector Y) that are to be operated on, as well as the storage request SREQ for elements of a vector (hereinafter referred to as vector Z) obtained as a result of operation.

An X-address control circuit 109X and a Y-address control circuit 109Y successively generate addresses of requests that are to be read by the vectors X and Y. A Z-address control circuit 109Z successively generates write addresses of requests of the vector Z. The main storage 111 which has received the fetch request FREQ reads vector elements of vectors X and Y according to fetch addresses XADR and YADR sent from the address control circuits 109X and 109Y via a data path 124. The element XDATA of the vector X and the element YDATA of the vector Y that are read out, are sent to a merging operation circuit 110Z.

The merging operation circuit 110Z consists of a comparator 806 that compares the data XDATA with the data YDATA, and a selector 800. The selector 800 selects the data XDATA or the data YDATA (whichever the smaller). The data that is selected is written into the main storage 109 as an element of the vector Z as a result of the operation. The writing address for this purpose is generated by the aforementioned Z-address control circuit 109Z. Thus, the merging operation is completed for the pair of data. A vector element that follows a vector element (e.g., XDATA) selected by the above selector 800 is read by a corresponding address control circuit, e.g., by the X-address control circuit 109X, supplied to the merging operation circuit 110Z, and is subjected to the merging operation again together with the data (e.g., YDATA) that was not selected in the previous time. The same operation is repeated hereinafter.

As the operand control circuit 106 detects the termination, a control signal ENDO that indicates this fact is sent to a timing control circuit 105, whereby the fetch request FREQ and the store request SREQ are no longer sent, and the instruction is terminated. Thereafter, the next instruction is taken out from the main storage 111 and is set to the instruction word register 101 to continue the processing.

The operation mentioned above is the same as the merging operation using the conventional vector processor.

The feature of this embodiment is as described below. Namely, the feature of this embodiment resides in the provision of an X ascending order judging circuit 110X, a Y ascending order judging circuit 110Y, a mode control circuit 107, and a next operation control logic 108 which operates in response to the outputs of these circuits and the output of the comparator 806.

The X ascending order judging circuit 110X compares the vector element XDATA with the element of the previous vector X, and judges whether the vector element XDATA is in the ascending order.

The Y ascending order judging circuit 110Y performs the same operation for the element YDATA of the vector Y.

The mode control circuit 107 stores a mode signal MODE which designates which one of ascending order merging (i.e., operation for selecting the smaller data between the two input data) or the descending order merging (i.e., operation for selecting the larger data between the two input data) is to be performed by the merging operation circuit 110Z. That is, the element XDATA of the vector X read from the main storage 111 is sent to the X ascending order judging circuit 110X and is compared with the element of the previously read vector X, and where it is judged whether the data XDATA is in ascending order relative to the previous data. A signal CMP1 represents the result of judgement.

Similar judgement is rendered by the Y ascending order judging circuit 110b for the element YDATA of the vector Y, and a signal CMP3 is produced to represent the result of judgement.

In response to the signals CMP1, CMP2 and a mode signal stored in the mode control circuit 107, the next operation control logic 108 determines whether the ascending order merging operation mode or the descending order merging operation mode is to be effected for the data XDATA, YDATA supplied to the merging operation circuit 110Z and sends a signal UPMC to the mode control circuit 107 when the mode is to be changed. Depending upon the output CMP2 of the comparator 806 for the data XDATA, YDATA and the operation mode determined above, the selector 800 is so controlled as to select either one of these data. Furthermore, the X ascending order control circuit 110X and the Y ascending order control circuit 110Y are controlled by the UP1, UP2, and UP3 signals from the next operation control logic 108.

The signals UP1, UP2 and UP3 work to carry out these control operations.

Thus, it is possible to dynamically change the kind of operations depending upon the result of an operation while one vector is being processed. In the case of merge sorting, for example, the operation is carried out in such a manner that the merge outputs are produced in increasing order (ascending order merging) for the vectors of ascending order subsequence and that the merge outputs are produced in a decreasing order (descending order merging) for the vectors of descending order subsequence while looking for the vectors of ascending order subsequence or descending order subsequence among the vectors. Therefore, the vector operation is carried out efficiently accompanied by neither the divide overhead into subsequence vectors nor the start up overhead for vector instruction.

Figure 1:
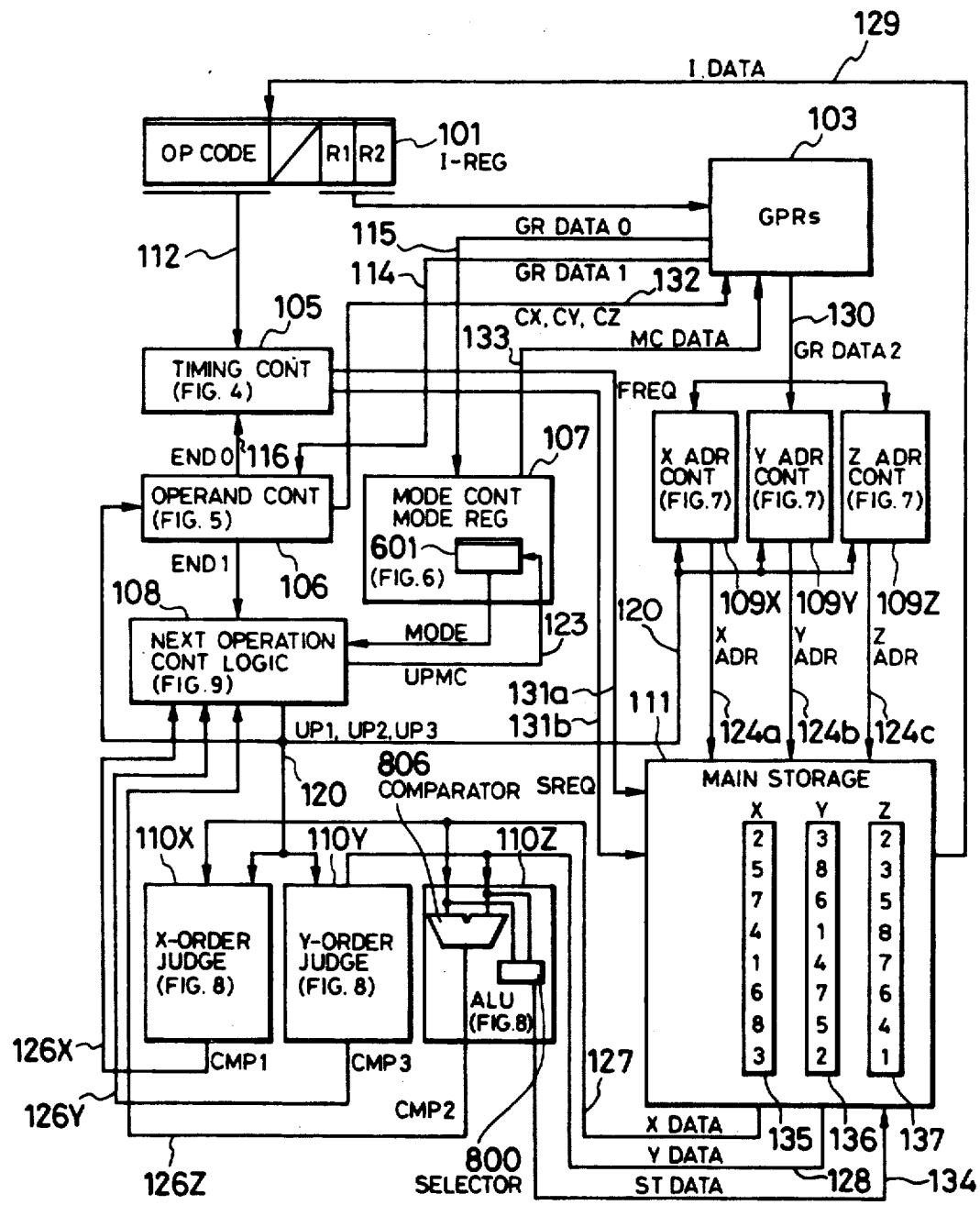
FIG. 1 is a diagram illustrating the structure of a vector processor according to an embodiment of the present invention.

Prior to describing the vector processor of FIG. 1 in detail, the instruction format of vector instruction according to the embodiment will now be described with reference to FIG. 2, wherein a vector instruction consists of 32 bits. The upper 16 bits 201 of the instruction represent the kind of vector instruction. An R1 field 202 represents a binary integer consisting of 4 bits, and designates a general-purpose register 204 that has a number indicated by the R1 field, as well as the registers 205, 206, 207, 208 and 209 that follow register 205 among the group of 16 general-purpose registers 103 (FIG. 1). Similarly, an R2 field designates a general-purpose register 210 having a number indicated by the R2 field as well as the registers 211, 212 and 213 that follow register 210.

The general-purpose registers 204, 206 and 208 hold start addresses of the vector X, vector Y and vector Z, respectively.) The general-purpose registers 205, 207, and 209 hold the total number of elements of the vectors X, Y and Z, respectively.) The general-purpose registers 210, 211 and 212 hold processed vector elements of the vectors X, Y and Z, respectively.) The general-purpose register 213 constitutes one of the features of the present invention, and holds the operation mode. The vector operation that performs the processing of FIG. 11 will hereinafter be referred to as a multi-mode merging operation.

As shown in FIG. 1, the vector X consists of data elements in the form of vectors that are to be sorted, and the vector Y consists of those data elements of the vector X but arranged in reverse order. Concretely speaking, the address of a start of the vector Y is set to be equal to the address of a final element of the vector X, the address of the final element is successively reduced as will be described later, the address of an element of the vector X to be read is generated as an element of the vector Y, the main storage 111 is accessed relying upon the address that is generated, and the elements of the vector X are read out in reverse order as the vector Y.

Therefore, there is no need to form the vector Y from the vector X in advance to store it in the main storage 111. For the purpose of easy comprehension in FIG. 1, the vector Y is described separately from the vector X. The invention, however, can be adapted quite in the same manner even when the vector Y is quite another thing from the vector X.

In this embodiment, it is presumed that the number of vector elements is all "8" in the general-purpose registers 205, 207, 209. Further, "0" may be set as an initial value for the number of the processed elements in the general-purpose registers 210, 211 and 212. Zero is also set as an initial value for the operation mode 213.

Next, operation of the vector processor will be described in detail with reference to FIG. 11. Concretely speaking, the flow of the time chart of FIG. 3, which shows the progress of processing, will also be referred to while taking the structures of the related logic circuits (FIGS. 4 to 9) into consideration.

Figure 3:
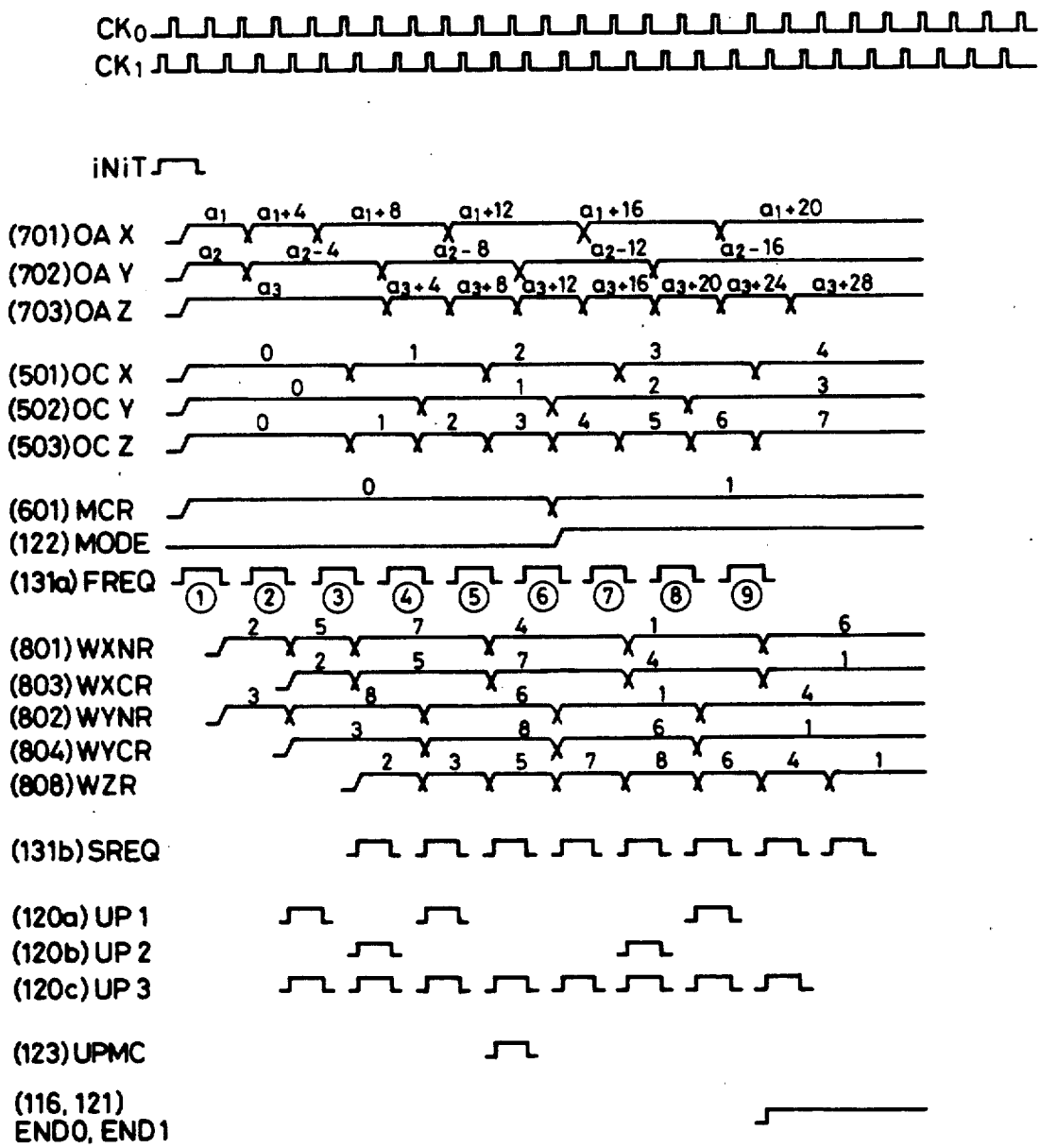
FIG. 3 is a time chart which illustrates the operation.

FIG. 3 is a time chart that illustrates the operation of the vector processor of FIG. 1. As shown in FIG. 3, the vector processor employs clock signals of two phases $CK_0$ and $CK_1$ for maintaining synchronism.

Figure 4:
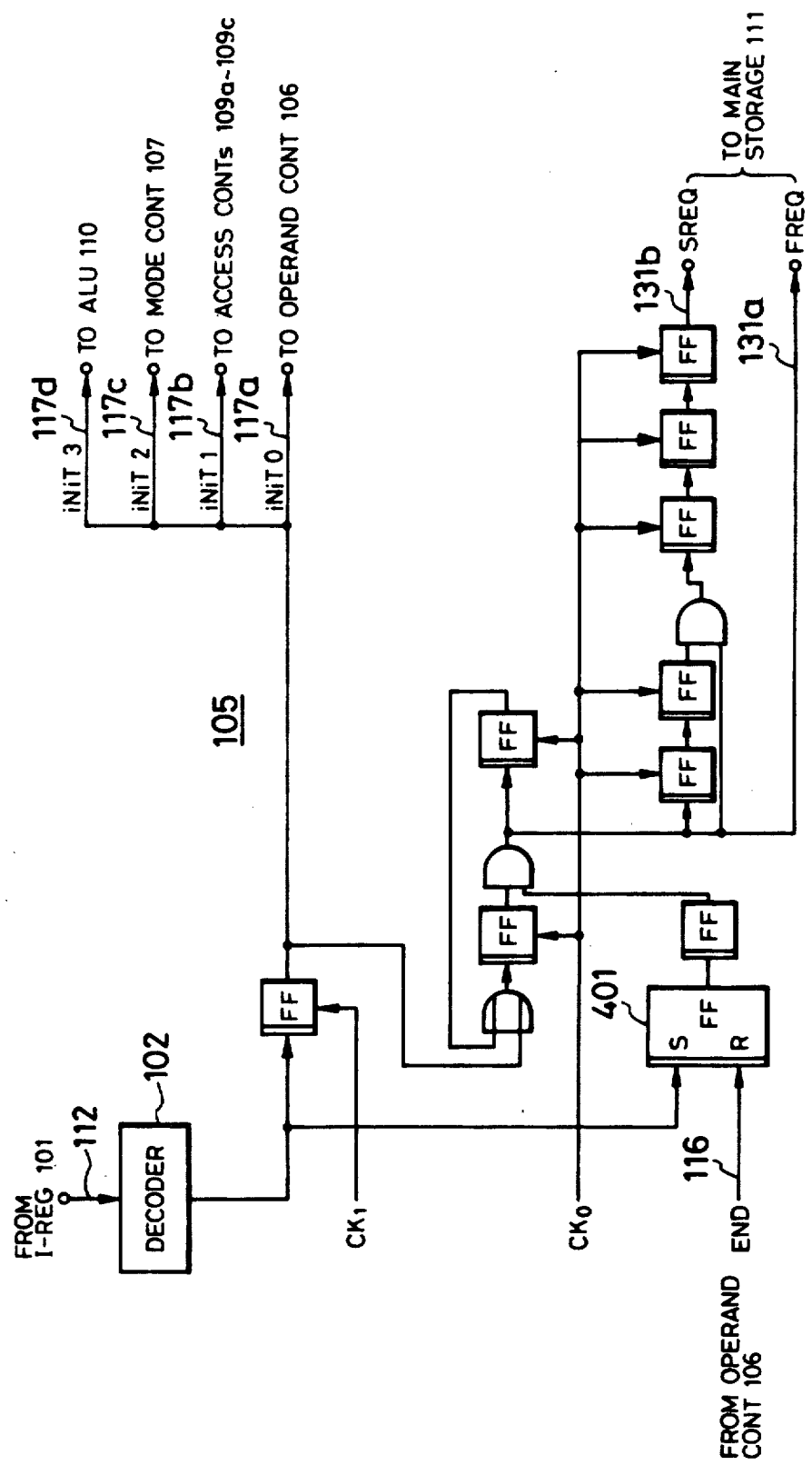
FIG. 4 is a diagram illustrating the structure of a timing control circuit.

FIG. 4 is a diagram which illustrates the structure of the timing control circuit 105, wherein FF denotes a flip-flop.

Figure 2:
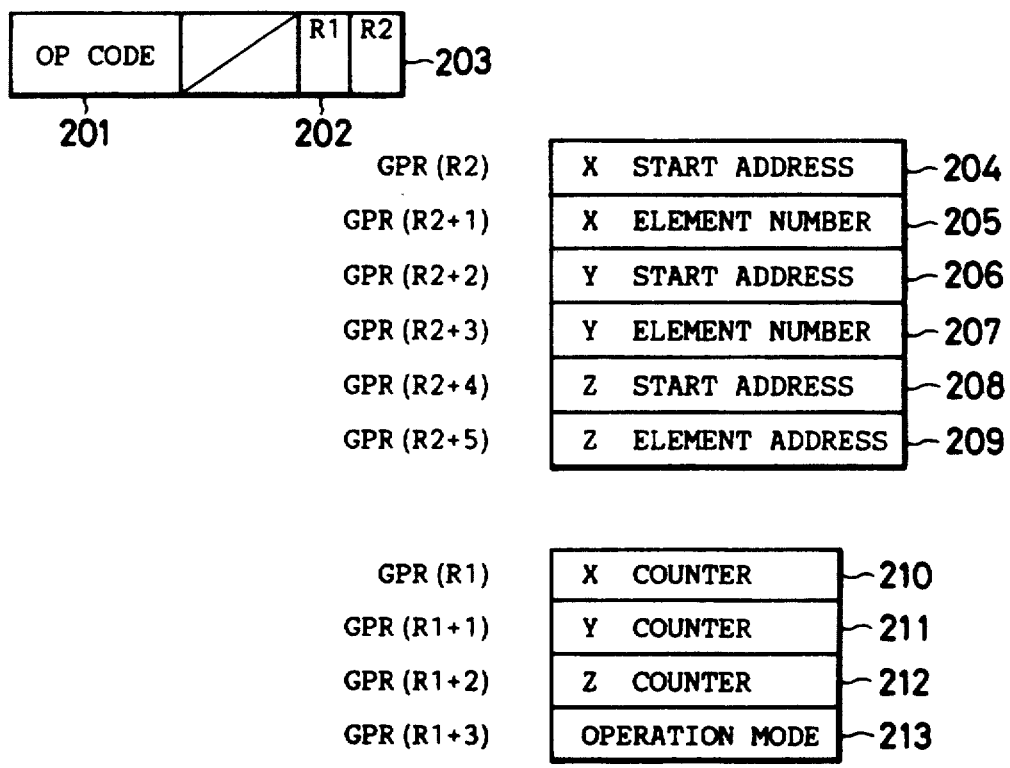
FIG. 2 is a diagram illustrating an instruction format.

When it is determined as a result of decoding by a decoder circuit 102 that the vector instruction of the form shown in FIG. 2, sent from the instruction register 101 via a data path 112, is a multi-mode merging instruction, the timing control circuit 105 sends control signals iNiT0 to iNiT3 (117a to 117d that initialize the circuits. At the same time, a hold-type flip-flop 401 is set to indicate that the multi-mode merging instruction is being processed.

Figure 5:
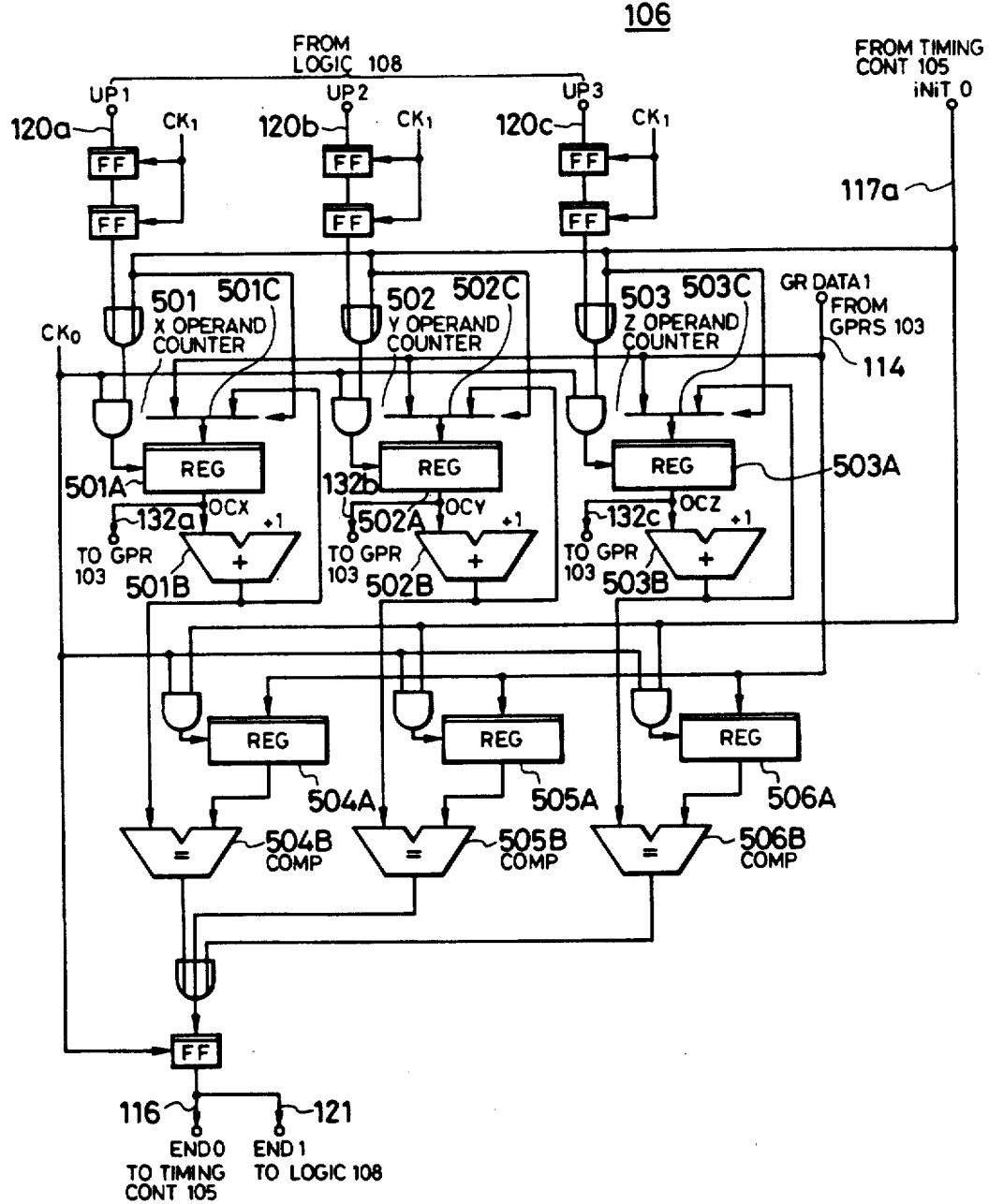
FIG. 5 is a diagram illustrating the structure of an operand control circuit.

FIG. 5 illustrates the structure of the operand control circuit 106, wherein reference numerals 501 to 503 denote operand counters for counting the number of processed elements in the vectors X, Y and Z. The counter 501 consists of an operand count register 501A, a+1 adder 501B for renewing the value of the operand count register 510A, and a selector 501C. Other counters 502 and 503 are constructed in the same manner.

Being designated by an iNiT0 signal 117a, the value of the general-purpose registers 210, 211 and 212, i.e., the initial value "0", is set to the operand count registers 501A, 502A and 503A in the operand control circuit 106 via selectors 501C, 502C and 503C. Being designated by the iNiT0 signal, furthermore, the value of the general-purpose registers 205, 207 and 09, i.e., "8" is set to the total element number registers 504A, 502A and 506A. Thus, the operand control circuit 106 is initialized.

The comparator 504B compares the number of the processed vector elements in the register 501A with the number of the vector elements in the register 504A. Other comparators 505B and 506B also operate in the same manner. When a coincidence signal is detected from any one of these comparators, the termination signals END0 and END1 are produced.

Figure 6:
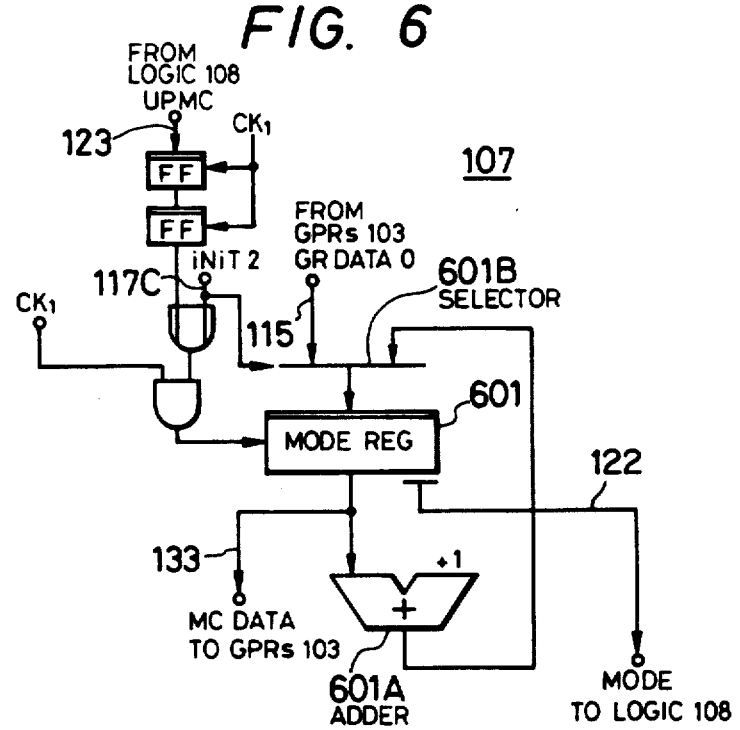
FIG. 6 is a diagram illustrating the structure of a mode control circuit.

FIG. 6 is a diagram illustrating the structure of the mode control circuit 107. Being designated by an iNiT2 signal 117C, the initial value GRDATA (0 in this case) of the operation mode stored in the general-purpose register 213 is initially set to the operation mode count register 601 via selector 601B. Initialization of the mode control circuit 107 is thus completed. Reference numeral 601A denotes an adder that adds +1 to the content of the register 601. The counter is constituted by the adder 601A and the register 601.

Figure 7:
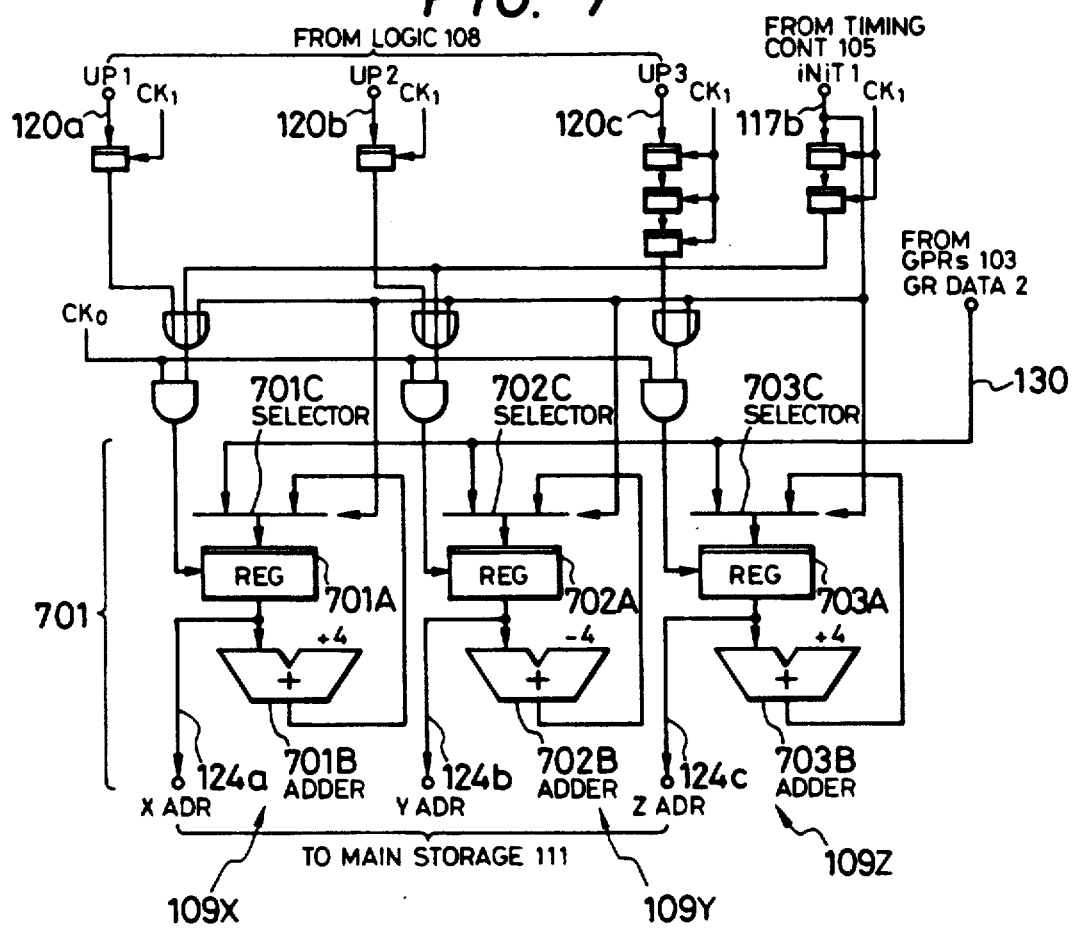
FIG. 7 is a diagram illustrating the structure of an address control circuit.

FIG. 7 is a diagram illustrating the structure of the address control circuits 109X, 109Y and 109Z. The X address control circuit 109X consists of an address register 701A which holds the addresses of X vector elements, a +4 adder 701B for renewing the value thereof by +4, and a selector 701C. The Y address control circuit 109Y consists of an address register 702A for holding the addresses of Y vector elements, a −4 adder 702B for renewing the value thereof by −4, and a selector 702C. The Z address control circuit 109Z is constituted in the same manner as the X address control circuit 109X.

Being designated by an iNiT1 signal 117b, the start addresses (a1, a2, a3) of the vectors X, Y and Z stored in the general-purpose registers 204, 206 and 208 are set to the address registers 701A, 702A and 703A. Initialization of the address control circuits 109X, 109Y and 109Z is thus completed.

Subsequent to one clock of DEC signal 113, a fetch request signal FREQ is sent from the timing control circuit 105 (FIG. 4) to the main storage 111. Thereafter, the signal FREQ is produced after every other clock until the operation is terminated.

Upon receipt of the first fetch request signal (①) of FIG. 3), the main storage 111 reads the vector elements XDATA and YDATA, using the X vector element address XADR and Y vector element address YADR sent from the address registers 701A and 702A via data paths 124a and 124b as fetch addresses, and sends them to the X ascending order judging circuit 110X, Y ascending order judging circuit 110Y and the operation circuit 110Z.

Figure 8:
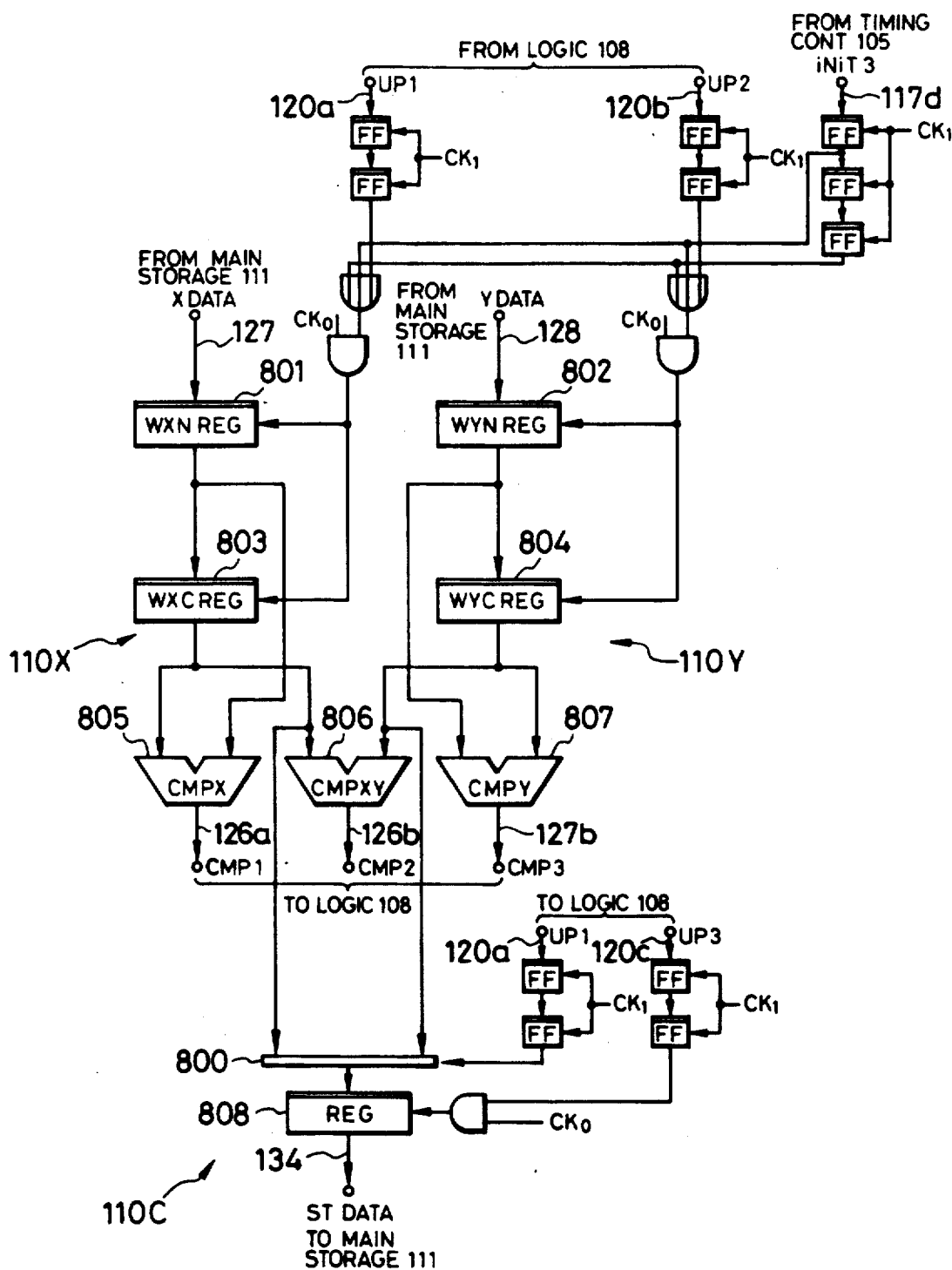
FIG. 8 is a diagram illustrating the structure of an operation circuit.

FIG. 8 illustrates the structure of the X ascending order judging circuit 110X, Y ascending order judging circuit 110Y and operation circuit 110Z. The X ascending order judging circuit 110X consists of a work register 801 (hereinafter referred to as WXN register) for holding the vector element XDATA, a register 803 (hereinafter referred to as WXC register) for holding the vector element that was read earlier than the above vector element, and a comparator 805 that compares the values in these registers. The Y ascending order judging circuit 110b is also constructed in the same manner. The operation circuit 110C consists of a comparator 806 that compares the X vector elements and the Y vector elements in the registers 803 and 804, and a selector 800 that selects one of these registers. In FIG. 8, symbol FF denotes a flip-flop.

The start elements "2" and "3" of the vectors X and Y read from the main storage 111 are set by an iNiT3 signal 117d to the WXN register 801 and the WYN register 802, respectively.

Upon receipt of a 2-clock delay signal of iNiT1 signal 117b, the address registers 701 and 702 in the address control circuits 109a and 109b (FIG. 7) gain values +4 and −4, respectively to assume addresses for the next elements. The vector elements "5" and "8" designated by these addresses are read according to the fetch request (② in FIG. 3) of the second time period, are sent to the X ascending order judging circuit 110X, Y ascending order judging circuit 110Y and operation circuit 110Z (FIG. 8). The vector elements "5" and "8" that are sent are set by a 3-clock delay signal of iNiT3 signal to the XWN register 801 and WYN register 802. At the same time, the data "2" and "3" stored in the WXN register 801 and WYN register 802 are transferred to the WXC register 803 and WYC register 804, respectively. The comparators 805, 806 and 807 compare the contents of the WXN register 801 and the WXC register 803, the contents of the WXC register 803 and the WYC register 806, and the contents of the WYN register 802 and the WYC register 804, respectively, and the compared results COMP1, COMP2 and COMP3 are sent to the next operation control logic 108 via signal lines 126a, 126b and 127c.

Figures 9, 10:
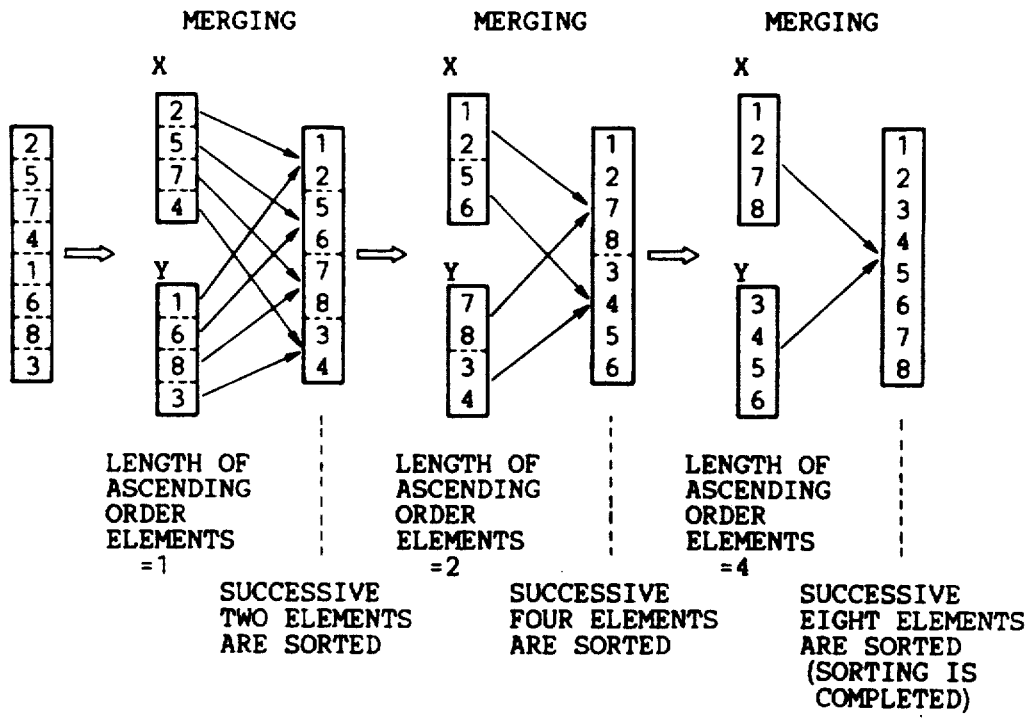
FIG. 9 is a truth table which illustrates the operation of a next operation control logic.
FIG. 10 is a diagram illustrating a method of merge sorting using a conventional vector processor.

FIG. 9 is a truth table which illustrates the operation of the next operation control logic 108. Depending upon the value of a signal MODE (122) that represents a value of the operation mode register 601, the next operation control logic 108 can be divided into entry numbers 1 to 6 (108a) and entry numbers 7 to 13 (108b). That is, 108a represents the case of the ascending order merging mode (MODE=0) and 108b represents the case of the descending order merging mode (MODE=1). Here, the signal COMP1 represents 2≦5, the signal COMP2 represents 2≦3, and the signal COMP3 represents 3≦8. In the operand control circuit 106 (FIG. 5), furthermore, the numbers OC1, OC2 and OC3 of the processed elements are all "0" in the operand counter registers 501A, 502A and 503A, and the values are all "8" in the element number register 504B, 505B and 506B. Therefore, the signal END0 or END1 is "0". Furthermore, since the value of the operation mode register 601 is "0", the signal MODE (122), consisting of the least significant bit, also assumes "0". Therefore, the operation (ascending order merging) of entry number 1 is selected in the truth table of FIG. 9, and the output signals UP1 (120a), UP2 (120b), UP3 (120c) and UPMC (123) are produced having values "1", "0", "1" and "0", respectively. These output signals are sent to the operand control circuit 106, mode control circuit 107 and address control circuits 109X, 109Y and 109Z, and the registers are renewed. When the operation of the entry number 1 is designated in FIG. 9, the signal UP1 (120a) and the signal UP3 (120c) assume the level "1" and whereby the vector element counter registers 501A and 503A (FIG. 5) of the vectors X and Z are counted up by +1. Further, the address registers 701A and 703A (FIG. 7) are renewed (+4) to designate the next vector elements. On the other hand, the signal UP2 (117b) assumes the level "0", and the vector element counter register 502A of the vector Y and the address register 702A (FIG. 7) are not renewed. Similarly, since the signal UPMC (123) remains at the level "0", the operation mode register 601 (FIG. 6) is not renewed, either. This means the following. As described above with reference to FIG. 9, the signal MODE (122) assumes the level "0", i.e., the ascending order vector merging is effected from the entry number 1 up to the entry number 6 (108a), and the signal MODE assumes the level "1", i.e., the descending order vector merging is effected from the entry number 7 up to the entry number 13 (108b). On the other hand, the initial value of the operation mode register 601 is "0" which designates the ascending order mode. Here, it is obvious from the results of COMP1 (126a) and COMP3 (126c) that the data are arranged in the ascending order, and there is no need of changing the mode.

The fetch request of the third time (③ in FIG. 3) is generated according to the renewed addresses. That is, the X operand address XADR is "a1+8" and the Y operand address YADR is "a2−4". Therefore, the data "7" and "8" are read from the main storage 111. That is, as for the vector Y, the same vector elements as those for the fetch request of the second time are read out. The data "7" and "8" that are read out are sent to the X ascending order judging circuit 110X, Y ascending order judging circuit 110Y and operation circuit 110Z. The vector element "7" of the vector X is set to the WXN register 801 (FIG. 8) since UP1=1. However, since UP2=0, the vector element "8" of the vector Y is not set to the WYN register 802 (FIG. 8), and the content of this register is not renewed. Similarly, the initial value "5" of the WXN register 801 is set to the WXC register 803, but the content of the WYN register 804 is not renewed. Here, since UP1=1, the initial value "2" of the WXC register 803 is set to the WX register 808 that stores the data.

After clocking of the fetch request signal FREQ (③) of FIG. 3) during the third time period, a first store request signal SREQ (131b) is sent from the timing control circuit 105 to the main storage 111.

The store request is effected using the content ZADR of the address register 703A of the Z address control circuit 109C (FIG. 7) as the store address and the content of the WZ register 808 (FIG. 8) as the store data STDATA (134). Therefore, "2" is stored in the address "a3" as the first element of the vector Z.

A next operation result is produced from the next operation control logic 108 in parallel with the storing operation, i.e., after one clock of the fetch request (③) of FIG. 3) of the third time period. This time, the signal CMP1 (126X) represents 5≦7, CMP2 (126Y) represents 5>3, CMP3 (126Z) represents 3≦8, END0 and END1 represent 0, and MODE (122) represents 0. Therefore, the operation of the entry number 2 is selected, i.e., the operation of the case where the side of the vector Y is small is selected in the ascending order mode merging, so that UP1 (120a) assumes 0, UP2 (120b) assumes 1, UP3 (120c) assumes 1, and UPMC (123) assumes 0. Accordingly, the address register 701A and the operand count register 501A are not renewed, 4 is subtracted from the address register 702A so that it assumes a2−8, and 1 is added to the operand count register 502A so that it assumes 1. Moreover, 1 is added to the operand count register 503A so that it assumes 2. A fetch data "6" corresponding to the fetch request (④ of FIG. 3) of the fourth time period is set to the WYN register 802, "8" is inputted to the register 804, and "3" is set to the WZ register 134 and is stored as the second element of the vector Z. Contents of the WXN register 801 and WXC register 803 are not renewed.

The operation hereinafter is continued in the same manner. In the operation for the fetch data that corresponds to the fetch request (④ of FIG. 3) of the fourth time period, CMP1 (126a) represents 5≦7, CMP2 (126b) represents 5≦8, and CMP3 (126c) represents 8>6. From the results of CMP1 and CMP3, it is obvious that the elements in the vector X are still arranged in the ascending order but there no longer exist ascending order elements in the vector Y. The operation of the entry number 3 (ascending order mode) is selected in FIG. 9, the operand count registers 501A, 503A of the side of the vectors X and Y are renewed, address registers 701A and 703A are renewed, and WXN register 801, WXC register 803 and WZ register 808 are renewed, and the data "5" of the side of the vector X is stored as a next element of the vector Z.

In response to the fetch request (⑤ in FIG. 3) of the fifth time period, "4" is set to the WXN register 801 and "7" is set to the WXC register 803. As a result of operation, CMP1 represents 7>4, CMP2 represents 7≦8, and CMP3 represents 8>6, from which it is learned that there no longer exists any ascending order element in the vector X. This time, therefore, the operation is switched to the descending order element merging. Concretely speaking, the operation of the entry number 5 is selected in FIG. 9, and the operand count registers 502A and 503A for the vectors Y and X, address registers 702A, 703A, and work registers 802 and 803 are renewed, and the data "8" on the side of the vector Y is stored as an element of the vector Z. Since the ascending order vector merging has been finished as mentioned earlier, the signal UPMC (123) is rendered to assume "1" and the operation mode register 601 is renewed (+1) in order to change the operation to the descending order vector merging. Therefore, the signal MODE (122) assumes 1.

In response to the fetch request (⑥ in FIG. 3) of the sixth time period, "1" is set to the WYN register 802 and "6" is set to the WYC register 804. As a result of operation, CMP1 represents 7≧4, CMP2 represents 7≧1, CMP3 represents 6≧1, and MODE is 1. Therefore, the merging is effected for the descending order vector elements. Concretely speaking, the operation (descending order mode) of the entry number 8 is selected in FIG. 9, and whereby the operand count registers 501A, 503A for the vectors X and Z, address registers 701A, 703A, and WXN register 801, WXC register 803 and WZ register 808 are renewed, respectively. Here "7" is stored in the main storage 111 (the larger one is produced since the descending order merging is being carried out). The mode remains unchanged since both the vectors X and Y are in the descending order.

In response to the fetch request (⑦ in FIG. 3) of the seventh time period, "1" is set to the WXN register 801 and "4" is set to the WXC register 803. As a result of operation, CMP1 represents 4≧1, CMP2 represents 4≦6, and CMP3 represents 6≧1. Like the previous time period, therefore, the operation (descending order mode) of the entry number 7 is selected in FIG. 9, and whereby the operand counter registers 502A, 503A for the vectors Y and Z, as well as address registers 702A, 703A, WYN register 802, WYC register 804 and WZ register 808 are renewed, respectively. The data "6" of the side of the vector Y is stored as a next element of the vector Z.

In response to the fetch request (⑧ in FIG. 3) of the eighth time period, "4" is set to the WYN register 802 and "1" is set to the WYC register 804. As a result of operation, CMP1 represents 4≧1 CMP2 represents 4>1, and CMP3 represents 1<4, from which it is learned that the descending order vector element still exists on the side of the vector X but no descending order vector element exists on the side of the vector Y. Here, the operation (descending order mode) of the entry number 9 is selected in FIG. 9, whereby the operand count registers 501A, 503A for the vectors X and Z, as well as address registers 701A, 703A, WXN register 801, WXC register 803 and WZ register 808 are renewed, respectively, and the data "4" on the side of the vector X is stored as an element of the vector Z.

In response to the fetch request (⑨ in FIG. 3) of the ninth time period, "6" is set to the WXN register 801 and "1" is set to the WXC register 803. As a result of operation, CMP1 represents 1<6, CMP2 represents 1≦1, and CMP3 represents 1<4. This time, however, since the element number register 503A of vector Z has "7", the END0 and END1 signals (116, 121) assume "1", and the operation of the entry number 13 is selected in FIG. 9. Accordingly, the operand count register 503A of the side of the vector Z, the address register 703A, and the WZR register 808 are renewed, and the data of the side of the vector Y is stored as an element of Z.

The END0 signal (116) is sent to the timing control circuit 105, a flip-flop 401 is reset to indicate that the multi-mode merging instruction is being executed, the fetch request signal FREQ (131a) is no longer produced, and after 3 clocks, the store request signal SREQ (131b) is no longer produced. Moreover, values 4, 3 and 7 of the final status of the operand count registers 501A, 502A and 503A, as well as a value 1 of the final status of the operation mode register 601 are written back into the corresponding general-purpose registers 210, 211, 212, and 213 via data paths 132a, 132b, 132c and 133, whereby the processing of the multi-mode merging instruction is completed.

In describing the operation of this embodiment, the initial value of the mode register 601 was started with "0" which is an even number. This means that the operation is started looking for the ascending order vector elements first. The data are stored in ascending order even in the vector Z. If the initial value of the mode register 601 is started with an odd number such as "1", then the data are stored in descending order in the vector Z. Accordingly, the sorted results are obtained in ascending order if the multi-mode merging is repeated with the initial value of the mode register being set to an even number at all times, and the sorted results are obtained in descending order if the initial value is started with an odd number at all times.

The present invention can further be applied to the below-mentioned case. Namely, in the aforementioned embodiment, the ascending order vector elements and the descending order vector elements in the vectors were detected, and the consecutive two elements were compared.

The detection can be effected even by using a mask vector. That is, a mask vector M1 is prepared in which M1(i)=1 corresponds to the ascending order vector elements X(i) in the vector X and M1 (j)=0 corresponds to the descending order vector elements X(j). A mask vector M2 is prepared in the same manner even for the vector Y. Then, the merging operation unit is prepared based upon the two mask vectors such that the elements X(k) and Y(l) of the vectors X and Y are merged in the descending order when M1(k)=0 and M2(l)=0, and are merged in the ascending order when M1(k)=1 and M2(l)=1.

According to the present invention as described above, when the vector operand that is input consists of a plurality of partial vectors having various properties, the elements for each of the partial vectors are operated, breaking portions among the partial vectors are detected, and the kind of operation is changed depending upon the properties of the partial vectors, all of these operations being carried out in parallel with each other making it possible to perform the processing at high speeds. In the case of the multi-mode merging instruction, for instance, the ascending order and descending order vector elements that spontaneously exist in the input vector operand are detected and, at the same time, the merging operation is carried out in a different mode depending upon the ascending order vector elements and the descending order vector elements. Therefore, the number of times the merging operation must be performed can be decreased, as compared with when there are not utilized the ascending order and descending order vector elements in the input vector operand. In practice, the data to be sorted are often biased such as by being almost all sorted. In particular, the greatest effects are obtained when the inputs have been sorted in advance, and the multi-mode merging instruction needs to be operated one time using the vector processor of the present invention. Using the conventional vector processor, however, the merging must be effected $\log_2 N$ number of times (when the number of the elements is N). Further, the number of vector elements in each merging can be selected to be N. Moreover, since there is no decomposition into partial vectors nor overhead for starting up the vector instruction, the time required for one time of merging is the same as that of the conventional art. Therefore, the operation speed of the vector processor of the present invention is increased by $\log_2 N$ times for the inputs that have been sorted in advance.

When the ascending order and descending order vector elements that spontaneously exist in the input vectors are to be utilized, it is necessary to know whether the sorting is completed or not after the multi-mode merging instruction has been executed. According to the method of FIG. 10, which does not utilize the partial vectors, the sorting is necessarily completed after $\log_2 N$ times of merging. According to the method of FIG. 11, however, the sorting may have already been completed after the merging of one time. According to the present invention which counts the number of reversals of the mode, therefore, the value of the mode counter is examined after the multi-mode merging instruction is executed. When the value is the same as before the multi-mode merging instruction is executed, it means that all the inputs are arranged in ascending order or in descending order. Therefore, there is no need of effecting scanning to examine whether the sorting has been completed or not after the execution, and the operation can be carried out efficiently.

In the foregoing was described the vector merge processing according to an embodiment of the present invention. It should, however, be noted that the present invention is in no way limited thereto only, but it can be adapted to any other processing without departing from the scope of the claims.

What is claimed is:

1. A data merging apparatus comprising:
   (a) data storage means for storing a first sequence of data elements and a second sequence of data elements;
   (b) operation means adapted for receipt of a data element from the first sequence of data elements and a data element from the second sequence of data elements, for merging the first and second sequences of data elements, said operation means including selecting means for comparing the received data element from the first sequence with the received data element from the second sequence and means for selecting one of the compared data elements;

(c) supply means responsive to selection by said selecting means of the received data element from the first sequence for supplying the next sequential data element from the first sequence to said operation means and responsive to selection by said selecting means of the received data element from the second sequence for supplying the next sequential data element from the second sequence to said operation means;

(d) detection means for detecting whether a pair of consecutive data elements of the first sequence, including the received data element of the first sequence, are arranged in ascending order of value or in descending order of value and whether a pair of consecutive data elements of the second sequence, including the received data element of the second sequence, are arranged in ascending order of value or in descending order of value; and (e) determining means, responsive to the results of the detection by said detection means, for causing said selecting means to select the smaller one of the received data elements or the larger one of the received data elements, in accordance with the detection results.

2. A data merging apparatus according to claim 1, wherein said operation means further includes comparing means for comparing the received data elements, and said determining means is responsive to the results of the comparison for determining the smaller of the received data elements and the larger of the received data elements.

3. A data merging apparatus according to claim 2, wherein:

said detection means comprises a first comparator connected to said supply means for comparing pairs of sequential data elements from the first sequence, each pair of data elements from the first sequence including a preceding data element and a succeeding data element, to detect whether the preceding and succeeding data elements of the pair of data elements from the first sequence are arranged in an ascending order of value; and a second comparator connected to said supply means for comparing pairs of sequential data elements from the second sequence, each pair of data elements from the second sequence including a preceding data element and a succeeding data element, to detect whether the preceding and succeeding data elements of the pair of data elements from the second sequence are arranged in an ascending order of value; and said supply means includes means for supplying the pairs of data elements from the first and second sequences to said comparing means of said operation means.

4. A data merging apparatus according to claim 3, wherein said supply means comprises:

first read means for sequentially reading the first sequence of data elements from said data storage means;

a first next register connected to said first read means for receiving a data element of the first sequence from said first read means;

a first current register connected to said first next register for receiving the data element of the first sequence held by said first next register in synchronism with receipt of a succeeding data element of the first sequence by said first next register from said first read means;

second read means for sequentially reading the second sequence of data elements from said data storage means;

a second next register connected to said second read means for receiving a data element of the second sequence from said second read means;

a second current register connected to said second next register for receiving the data element of the second sequence held by said second next register in synchronism with receipt of a succeeding data element of the second sequence by said second next register from said second read means;

wherein said first comparator is connected to said first next register and said first current register to compare the contents thereof; and wherein said second comparator is connected to said second next register and said second current register to compare the contents thereof.

5. A data merging apparatus according to claim 4, wherein said comparing means of said operation means is connected to said first current register and said second current register to compare the data elements held by said first current register and said second current register in parallel with execution of comparison by said first and second comparators.

6. A data merging apparatus according to claim 2, adapted as a vector processor for executing vector instructions to process vector data including a set of vector elements, wherein:

(a) said data storage means comprises a main memory of the vector processor;

(b) said supply means comprises:
  (i) a first supply device responsive to a vector instruction for sequentially supplying a first sequence of vector elements from said main memory to said operation means; and
  (ii) a second supply device responsive to the vector instruction for sequentially supplying a second sequence of vector elements from said main memory to said operation means in parallel with the supplying of the first sequence of vector elements thereto; and (c) said detection means comprises:
  (i) a first detection device connected to said first supply device and responsive to successive vector elements of the first sequence, for detecting whether the successive vector elements of the first sequence are arranged in ascending order; and
  (ii) a second detection device connected to said second supply device and responsive to successive vector elements of the second sequence, for detecting, in parallel with the detection by said first detection device, whether the successive vector elements of the second sequence are arranged in ascending order.

7. A data merging apparatus according to claim 6, further comprising:

means for controlling said first and second detection devices to cause said first detection device to perform detection with respect to the compared vector element of the first sequence of vector elements and the next successive vector element of the first sequence of vector elements, and to cause said second detection device to perform detection with respect to the compared vector element of the second sequence of vector elements and the next successive vector element of the second sequence of vector elements, both detections being performed in parallel with the comparison by said comparing means.

8. A data merging apparatus according to claim 7, further comprising:
store means connected to said main memory and responsive to a vector instruction for sequentially storing a sequence of selected vector elements, from said selecting means, in a predetermined sequence of locations within said main memory.

9. A data merging apparatus according to claim 8, wherein the first sequence of vector elements is the first part of a group of vector elements to be sorted and the second sequence of vector elements is the remainder of the group of vector elements to be sorted.

10. A data merging apparatus according to claim 2, wherein said detection means includes means for performing detecting with respect to the received data elements as said comparing means is performing comparing with respect to the received data element.

11. A data merging apparatus according to claim 1, wherein said determining means includes means responsive to said detection means detecting that each of the compared data elements is a data element of a pair of data elements arranged in ascending order for causing said selecting means to select the smaller one of the received data elements, and means responsive to said detection means detecting that each of the compared data elements is a data element of a pair of data elements arranged in descending order for causing said selecting means to select the larger one of the received data elements.

12. A data merging apparatus according to claim 11, further comprising means for indicating whether an ascending order merge or a descending order merge is to be performed; and wherein said determining means includes:
means responsive to (i) said determining means not previously having caused said selecting means to select one of the received data elements, (ii) said indicating means indicating that an ascending order merge is to be performed, and (iii) said detection means detecting that the pair of data elements of one of the first and second sequences are arranged in ascending order and the pair of data elements of the other of the first and second sequences are arranged in descending order, for causing said selecting means to select the received data element from the ascending order data elements;
means responsive to (i) said determining means not previously having caused said selecting means to select one of the receive d data elements, (ii) said indicating means indicating that a descending order merge is to be performed, and (iii) said detection means detecting that the pair of data elements of one of the first and second sequences are arranged in ascending order and the pair of data elements of the other of the first and second sequences are arranged in descending order, for causing said selecting means to select the received data element from the descending order data elements;
means responsive to (i) said determining means most recently previously causing said selecting means to select the received data element from the ascending order data elements, (ii) said detection means detecting that the pair of data elements of one of the first and second sequences are arranged in ascending order and the pair of data elements of the other of the first and second sequences are arranged in descending order, for causing said selecting means to select the received data element from the ascending order data elements; and
means responsive to (i) said determining means most recently previously causing said selecting means to select the received data element from the descending order data elements, (ii) said detection means detecting that the pair of data elements of one of the first and second sequences are arranged in ascending order and the pair of data elements of the other of the first and second sequences are arranged in descending order, for causing said selecting means to select the received data element from the descending order data elements.

13. A data merging apparatus according to claim 1, wherein the first sequence of data elements is the first part of a group of data elements to be sorted and includes a starting data element of the group and the second sequence of data elements is the remainder of the group of data elements to be sorted and includes an ending data element of the group; and wherein said supply means includes means for supplying to said operation means the first part of the group of data elements, commencing with the starting data element of the group and continuing in sequence, and for supplying to said operation means the remainder of the group of data elements, commencing with the ending data element of the group and continuing in reverse sequence.

14. A data merging apparatus according to claim 1, further comprising:
storing means connected to said data storage means for sequentially storing a sequence of selected vector elements, from said selecting means, in a predetermined sequence of locations within said data storage means.

15. A method utilizing a computer of merging a first sequence of data elements and a second sequence of data elements, said method comprising the steps of:
(a) detecting whether two consecutive data elements in the first sequence are arranged in ascending order of value of in descending order of value and whether two consecutive data elements in the second sequence are arranged in ascending order of value of in descending order of value;
(b) determining one data element to be selected from a pair of data elements, including a data element from the first sequence and a data element from the second sequence, based upon the result of step (a);
(c) selecting the determined data element in accordance with the result of step (b); and
(d) repeating steps (a), (b) and (c) with the second of the two consecutive data elements in the sequence from which the selected data element was selected and the next consecutive data element in the last-named sequence and with the two data elements from the other sequence.

16. A method according to claim 15, further comprising comparing the data element from the first sequence with the data element from the second sequence; and wherein step (b) includes determining the data element to be selected as the smaller one of the compared data elements or the larger one of the compared data element.

17. A method according to claim 15, wherein step (b) includes determining that the smaller one of the compared data elements is to be selected when step (a) detects that both the detected data elements in the first sequence and the detected data elements in the second sequence are arranged in ascending order and determining that the larger one of the compared data elements is to be selected when step (a) detects that both the detected data elements in the first sequence and the detected data elements in the second sequence are arranged in descending order.

18. A method according to claim 17, wherein:
when an ascending order merge is to be performed and step (a) detects that the detected data elements in one of the first and second sequences are arranged in ascending order and the detected data elements in the other of the first and second sequences are arranged in descending order, step (b) further includes determining that the one of the compared data elements that is to be selected is the data element from the ascending order data elements; and
when a descending order merge is to be performed and step (a) detects that the detected data elements in one of the first and second sequences are arranged in ascending order and the detected data elements in the other of the first and second sequences are arranged in descending order, step (b) further includes determining that the one of the compared data elements that is to be selected is the data element from the descending order data elements.

19. A method according to claim 18, wherein:
during a repetition of steps (a), (b), and (c), when in the most recent preceding repetition the data element from the ascending order data elements was selected and the current repetition of step (a) detects that the detected data elements in one of the first and second sequences are arranged in ascending order and the detected data elements in the other of the first and second sequences are arranged in descending order, then the current repetition of step (b) further includes determining that the one of the compared data elements that is to be selected is the data element from the ascending order data elements; and
during a repetition of steps (a), (b), and (c), when in the most recent preceding repetition the data element from the descending order data elements was selected and the current repetition of step (a) detects that the detected data elements in one of the first and second sequences are arranged in ascending order and the detected data elements in the other of the first and second sequences are arranged in descending order, then the current repetition of step (b) further includes determining that the one of the compared data elements that is to be selected is the data element from the descending order data elements.

20. A method according to claim 18, further comprising as an initial step of determining whether an ascending order merge or a descending order merge is to be performed.

21. A method according to claim 16, wherein step (a) is performed with respect to particular data elements as the comparing step is performed with respect to the particular data elements.

22. A method as claimed in claim 16, further comprising repeating the comparing step and steps (a) to (d) until the first sequence of data elements and the second sequence of data elements are fully sorted to an ascending or descending order of value, with each repetition being performed on a sequence of selected data elements from the preceding repetition.

23. A method according to claim 15, further comprising repeating steps (a) to (d) until the first sequence of data elements and the second sequence of data elements are fully sorted to an ascending or descending order of value, with each repetition being performed on a sequence of selected data elements from the preceding repetition.

24. A vector processing apparatus comprising:
(a) storage means for storing vectors;
(b) operation means adapted to receive vector elements, for selectively executing on received vector elements one operation from a plurality of operations executable by said operation means;
(c) first supply means for sequentially reading out a first plurality of vector elements from said storage means and sequentially supplying the read out vector elements of the first plurality to said operation means;
(d) first comparator means for comparing each vector element of the first plurality as the first supply means is supplying the successive vector element; and
(e) control means responsive to the result of the comparison by said first comparator means for selecting the one operation to be executed by said operation means on the said each vector element.

25. A vector processing apparatus according to claim 24, further comprising:
second supply means for sequentially reading out a second plurality of vector elements from said storage means and sequentially supplying the read out vector elements of the second plurality to said operation means in parallel with the supplying of the vector elements of the first plurality to said operation means;
second comparator means for sequentially comparing each vector element of the second plurality with the successive vector element of the second plurality as said second supply means is supplying the successive vector element; and
wherein:
said operation means includes means for performing a selected operation on a data element from the first plurality and a data element from the second plurality; and
said control means includes means responsive to the results of a pair of comparisons by said first and second comparator means for determining the operation to be executed on the vector element of the first plurality and the vector element of the second plurality.

26. A vector processing apparatus according to claim 25, wherein:
said operation means includes third comparator means for comparing a vector element from the first plurality with a vector element from the second plurality; and select means for selecting either the compared vector element from the first plurality or the compared vector element from the second plurality; and said control means includes means responsive to the outputs of said first, second, and third comparator means for determining whether said select means selects the compared vector element from the first plurality of the compared vector element from the second plurality.

27. A vector processing apparatus according to claim 26, further comprising:

means for causing said first and second supply means to supply to said operation means the vector element next to the compared vector element selected by said select means and the compared vector element not selected by said select means, as a pair of vector elements on which an operation is to be performed.

28. A vector processing apparatus according to claim 27, wherein said first supply means includes means for sequentially supplying as the vector elements of the first plurality successive vector elements of a group of vector elements to be sorted starting with a start element thereof, and said second supply means includes means for sequentially supplying as the vector elements of the second plurality successive vector elements of said group starting with the final element thereof.

29. A data merging apparatus comprising:
(a) data storage means for storing a first sequence of data elements and a second sequence of data elements;
(b) a first comparator for comparing a first pair of data elements;
(c) means for selecting one of the compared first pair of data elements;
(d) first supply means connected to said data storage and said first comparator and responsive to selection by said selecting means of a data element from the first sequence of data elements for supplying the next sequential data element from the first sequence of data elements to said first comparator to be one data element of another first pair of data elements to be compared;
(e) second supply means, operated in parallel with operation of said first supply means, connected to said data storage means and said first comparator and responsive to selection by said selecting means of a data element from the second sequence of data elements for supplying the next sequential data element from the second sequence of data elements to said another first comparator to be the other data element of said another first pair of data elements to be compared;
(f) a second comparator connected to said first supply means for comparing two successive data elements of the first sequence;
(g) a third comparator operated in parallel with operation of said second comparator and connected to said second supply means for comparing two successive data elements of the second sequence; and
(h) control means responsive to comparison results of said first, second, and third comparators for controlling said selecting means to determine the selected one of the compared first pair of data elements.

30. A data merging apparatus according to claim 29, wherein:

said first supply means includes means for supplying from said data storage means the next sequential data element from the first sequence of data elements following the data element from the first sequence of data elements belonging to the first pair of data elements; and said second supply means includes means for supplying from said data storage means the next sequential data element from the second sequence of data elements following the data element from the second sequence of data elements belonging to the first pair of data elements.

31. A data merging apparatus according to claim 30, wherein:

said first supply means further includes means responsive to said selecting means, under control by said control means, selecting as the selected one of the compared first pair of data elements the data element of the first sequence of data elements, for supplying the data element of the first sequence further succeeding to said next succeeding data element of the first sequence of data elements, in parallel with performance of the selection by said selecting means; and said second supply means further includes means responsive to said selecting means, under control by said control means, selecting as the selected one of the compared first pair of data elements the data element of the second sequence of data elements, for supplying the data element of the second sequence further succeeding to said next succeeding data element of the second sequence of data elements, in parallel with performance of the selection by said selecting means.

32. A data merging apparatus according to claim 29, wherein said control means includes means responsive to said second and third comparators determining, respectively, that the compared two successive data elements of the first sequence of data elements are arranged in ascending order and the compared two successive data elements of the second sequence of data elements are arranged in ascending order, for controlling said selecting means to select the smaller one of the compared first pair of data elements, and means responsive to said second and third comparators determining, respectively, that the compared two successive data elements of the first sequence of data elements are arranged in descending order and the compared two successive data elements of the second sequence of data elements are arranged in descending order, for controlling said selecting means to select the larger one of the compared first pair of data elements.

33. A data merging apparatus according to claim 29, wherein:

said second comparator includes means for comparing the data element from the first sequence of data elements belonging to the currently compared first pair of data elements and the succeeding data element of the first sequence of data elements in parallel with comparison by said first comparator of the currently compared first pair of data elements; and said third comparator includes means for comparing the data element from the second sequence of data elements belonging to the currently compared first pair of data elements and the succeeding data element of the second sequence of data elements in parallel with comparison by said first comparator of the currently compared first pair of data elements.

34. A data merging apparatus comprising:
  (a) data storage means for storing a first sequence of data elements and a second sequence of data elements;
  (b) a first comparator for comparing a pair of data elements;
  (c) means for selecting one of the compared pair of data elements;
  (d) supply means connected to said data storage means and said first comparator for sequentially supplying data elements from the first sequence of data elements to said first comparator, each data element of the first sequence being supplied as one data element data element of the pair of data elements to be compared, each data elements of the first sequence of data elements being supplied in response to selection by said selecting means of a data element of the first sequence of data elements preceding the supplied data element of the first sequence of data elements, and for sequentially supplying data elements from the second sequence of data elements to said first comparator, each data element of the second sequence being supplied as the other data element of the pair of data elements to be compared, each data element of the second sequence of data elements being supplied in response to selection by said selecting means of a data element of the second sequence of data elements preceding the supplied data element of the second sequence of data elements; and
  (e) control means connected to said first comparator and responsive to the first sequence of data elements and the second sequence of data elements for controlling said selecting means to select data elements from the first sequence of data elements and data elements from the second sequence of data elements in a selection sequence merging the data elements into an ascending order of value or into a descending order of value, in response, respectively, to the first sequence of data elements and the second sequence of data elements both being arranged in an ascending order of value and to the first sequence of data elements and the second sequence of data elements both being arranged in a descending order of value.

35. A merging apparatus according to claim 34, wherein said control means includes:
  a second comparator connected to said first supply means for comparing two successive data elements from the first sequence of data elements;
  a third comparator operated in parallel with said second comparator and connected to said second supply means for comparing two successive data elements of the second sequence of data elements; and
  means responsive to comparison results of said first, second, and third comparators for controlling said selecting means to determining the selected one of the compared pair of data elements.

36. A data merging apparatus according to claim 34, wherein said supply means includes:
  a first supply device connected to said data storage means and said first comparator for sequentially supplying data elements from the first sequence of data elements to said first comparator, each data element of the first sequence of data elements being supplied as one data element of the pair of data elements to be compared by said first comparator, and each data element of the first sequence of data elements being supplied in response to selection by said selecting means of a data element from the first sequence of data elements; and
  a second supply device operated in parallel with said first supply device and connected to said data storage means and said first comparator for sequentially supplying data elements from the second sequence of data elements to said first comparator, each data element of the second sequence of data elements being supplied as the other data element of the pair of data elements to be compared by said first comparator, and each data element of the second sequence of data elements being supplied in response to selection by said selecting means of a data element from the second sequence of data elements.

37. A merging apparatus according to claim 36, wherein:
  said first supply means includes means for supplying from said data storage means the next sequential data element from the first sequence of data elements following the data element from the first sequence of data elements belonging to the pair of data elements; and
  said second supply means includes means for supplying from said data storage means the next sequential data element from the second sequence of data elements following the data element from the second sequence of data elements belong to the pair of data elements.

38. A merging apparatus according to claim 36, wherein:
  said second comparator includes means for comparing the data element from the first sequence of data elements belonging to the currently compared pair of data elements and the succeeding data element of the first sequence of data elements in parallel with comparison by said first comparator of the currently compared pair of data elements; and
  said third comparator includes means for comparing the data element from the second sequence of data elements belonging to the currently compared pair of data elements and the succeeding data element of the second sequence of data elements in parallel with comparison by said first comparator of the currently compared pair of data elements.

* * * * *